United States Patent [19]

Otobe et al.

[11] 4,107,729
[45] Aug. 15, 1978

[54] METHOD AND APPARATUS FOR REPRODUCING SIGNALS FROM A ROTATING RECORD MEDIUM AND METHOD AND APPARATUS FOR MAKING SAME

[75] Inventors: Takashi Otobe; Chiaki Kojima, both of Yokohama; Hiroshi Ohki, Tokyo, all of Japan

[73] Assignee: Sony Corporation, Tokyo, Japan

[21] Appl. No.: 751,179

[22] Filed: Dec. 16, 1976

[30] Foreign Application Priority Data

Dec. 23, 1975 [JP] Japan .................................. 50-154391

[51] Int. Cl.$^2$ .............................................. H04N 5/76
[52] U.S. Cl. ........................................................ 358/4
[58] Field of Search ............................................ 358/4

[56] References Cited

U.S. PATENT DOCUMENTS

| 3,809,804 | 5/1974 | Okuno et al. ............................. 358/4 |
| 3,953,881 | 4/1976 | Yanagimachi et al. ................... 358/4 |

*Primary Examiner*—Richard Murray
*Attorney, Agent, or Firm*—Lewis H. Eslinger; Alvin Sinderbrand

[57] ABSTRACT

A method of and apparatus for recovering information from a record medium of the type wherein the information is modulated onto a carrier and recorded in one portion of the record medium and the carrier is recorded in another portion of the record medium. The modulated information is reproduced from the record medium while the medium is rotated, and simultaneously, the carrier also is reproduced from the medium. The reproduced modulated information then is demodulated with the reproduced carrier to recover the original signal information. In one embodiment, the recorded information is a composite color television signal and the carrier constitutes the chrominance subcarrier for the color television signal.

Also disclosed is a method and apparatus for recording signal information on a rotatable record medium. A reference signal is provided and is recorded in a circular track on the record medium. Signal information also is provided and is modulated onto the reference signal, the modulated signal information then being recorded in a separate portion of the record medium. In one embodiment, the reference signal upon which the signal information is modulated is the previously recorded reference signal that has been played back from the record medium. The signal information may comprise color video signal components and the reference signal may comprise one or more subcarriers for the color video signal components. Preferably, the color video components which are modulated onto the subcarriers are combined with a luminance signal and recorded as a composite color television signal.

16 Claims, 3 Drawing Figures

METHOD AND APPARATUS FOR REPRODUCING SIGNALS FROM A ROTATING RECORD MEDIUM AND METHOD AND APPARATUS FOR MAKING SAME

BACKGROUND OF THE INVENTION

This invention relates to signal reproduction and, more particularly, to a novel method of and apparatus for reproducing signals which have been recorded in one portion of a rotatable record medium by using, as a demodulating signal, a reference signal that has been recorded in another portion of said medium. The present invention also relates to a method of and apparatus for recording such signals on the record medium.

Rotatable record media, such as a rotatable disc, drum, or the like, have long been used as a storage device upon which modulated signal information can be stored and subsequently reproduced. As an example, a rotatable record medium is known for the storage of video signal information, such as color television signals, audio signal information, such as stereophonic signals, quadrature audio signals, and pulse-coded information. When the signal information recorded on the record medium is recovered, it is necessary to demodulate the modulated signals with a local reference signal. As is known, this local reference signal should have the same frequency and phase as the carrier upon which the signal information has been modulated.

In typical signal reproducing apparatus, a local oscillator often is used to produce the local reference carrier. In some instances, this local oscillator is synchronized with the recorded, modulated carrier. For example, when color television signals are reproduced, the recorded composite color television signal generally includes a burst signal component, and this component is used to synchronize the local oscillator. However, if the rotation of the record medium during a signal reproducing operation is subjected to spurious fluctuations, the frequency of the reproduced signals varies in a corresponding manner and the local oscillator may not be precisely synchronized with the thus reproduced modulated signal information. Where the apparatus has been used for color television signal playback, this fluctuation results in chromatic aberration of the reproduced television picture. Where other types of signal information are recorded on the record medium, such fluctuations in the rotation thereof result in other unwanted effects.

OBJECTS OF THE INVENTION

Therefore, it is an object of the present invention to overcome such unwanted effects due to fluctuations in the rotation of a record medium during a signal reproducing operation.

Another object of this invention is to provide an improved method of and apparatus for recovering signal information which has been recorded in modulated form in a rotatable record medium.

A further object of this invention is to provide an improved method of and apparatus for recovering signal information from a rotatable record medium which is not affected by fluctuations in the rotation of the medium.

An additional object of this invention is to provide an improved method of and apparatus for recovering modulated signal information from a rotating record medium wherein the reference carrier used for demodulating the signal information also has been recorded on the medium.

Yet another object of this invention is to provide an improved method of and apparatus for recording signal information on a record medium which can be recovered therefrom substantially independently of any fluctuations of the medium during signal reproduction.

Various other objects, advantages and features of this invention will become readily apparent from the ensuing detailed description, and the novel features will be particularly pointed out in the appended claims.

SUMMARY OF THE INVENTION

In accordance with this invention, signal information is recovered from a record medium of the type having such information modulated and recorded in one portion thereof and having a reference carrier recorded in another portion thereof, the signal information being recovered by reproducing such information from the record medium while the medium rotates and simultaneously reproducing the reference carrier from the medium; and demodulating the reproduced modulated information with the reproduced reference carrier.

In accordance with one aspect of this invention, a method of and apparatus for recording such modulated signal information comprises recording the reference carrier on a circular track of the record medium; modulating signal information with the reference carrier; and recording the modulated signal information on a separate portion of the record medium.

In one embodiment, the modulated signal information is color television information and the reference carrier is the subcarrier for the chrominance components of the color television information.

BRIEF DESCRIPTION OF THE DRAWINGS

The following detailed description, given by way of example, will best be understood in conjunction with the accompanying drawings in which.

DETAILED DESCRIPTION OF PREFERRED EMBODIMENTS

Figure 1:
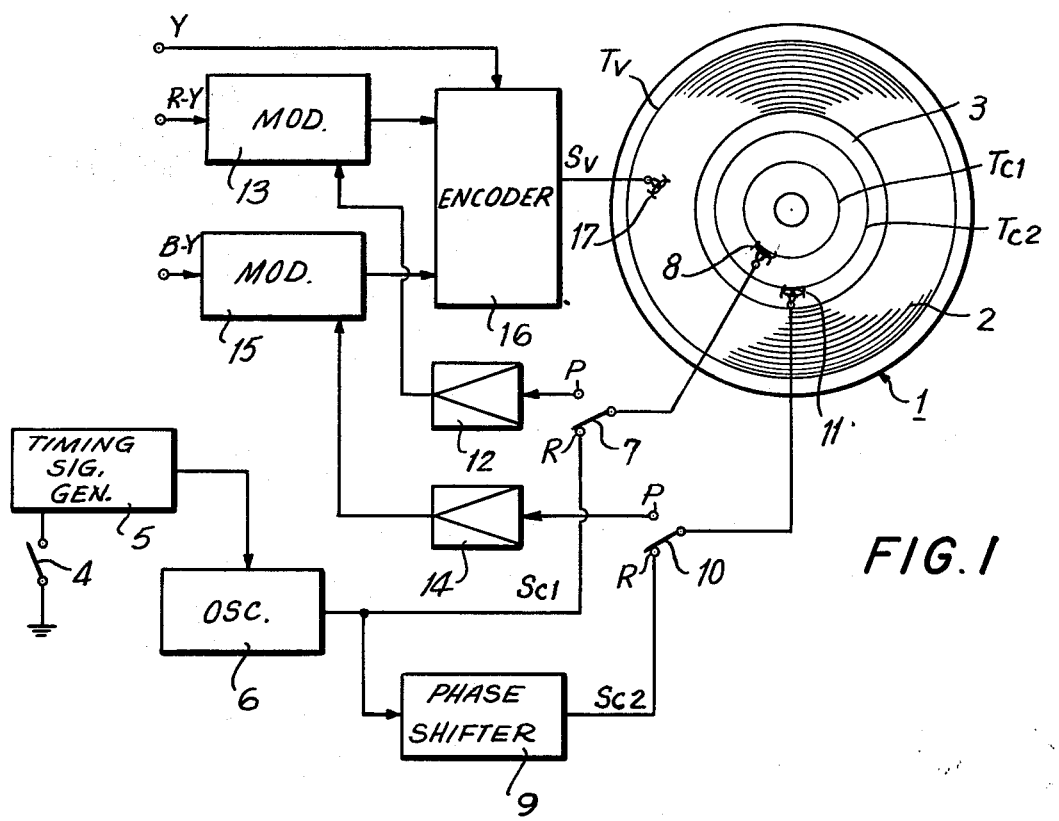
FIG. 1 is a block diagram of one embodiment of signal recording apparatus.

Referring now to the drawings, wherein like reference numerals are used throughout, and in particular to FIG. 1, there is illustrated one embodiment of signal recording apparatus. For the purpose of simplifying the following description, it will be assumed that the signals recorded on the record medium by the illustrated apparatus are color television signals. However, as will be described below, the teachings of this invention can be used to record other signal information, such as audio signal information. e.g., quadrature audio signals, pulse modulated information, and the like.

Record medium 1 is illustrated as a rotatable disc having a signal information recording portion 2 and an auxiliary portion 3 adapted to record one or more reference signals, such as a reference carrier, in a circular track on the record medium. Record medium 1 alternatively may comprise a rotatable drum having a signal information recording portion and an auxiliary portion.

In one embodiment, record medium 1 comprises a magnetic disc; and in an alternative embodiment, the record medium is adapted to have signal information and reference signals recorded thereon by the use of modulated light, such as an optical recording medium, or the record medium may be adapted to record an electron beam.

A reference carrier is recorded in a circular track $T_{c1}$ in auxiliary portion 3, this reference carrier being provided by an oscillator 6. For the application of the illustrated apparatus to record a color television signal, the reference carrier is the chrominance signal subcarrier having a frequency of approximately 3.58 MHz. The reference carrier provided by oscillator 6 is supplied via a switch 7 to transducer 8 for recording in track $T_{c1}$. Switch 7 is capable of assuming two conditions represented as contacts R and P, respectively. When switch 7 is in the condition whereby it engages contact R, the reference carrier is recorded.

In the embodiment wherein a color television signal is recorded, the chrominance components thereof are here illustrated as the red and blue color difference signals R-Y and B-Y, respectively. For the NTSC signal, the red and blue color difference signals are modulated on respective subcarriers having the same 3.58 MHz frequency but exhibiting quadrature phase relation. For this purpose, another reference carrier is recorded in track $T_{c2}$ in auxiliary portion 3 of record medium 1. Accordingly, a phase shifter 9 is coupled to oscillator 6 to provide a phase shift in the reference carrier, the output of phase shifter 9 being supplied via a switch 10 to a transducer 11. Switch 10 is similar to switch 7 and exhibits two conditions represented as R and P contacts. As one example, the reference carrier provided by oscillator 6 is coincident with the red color difference axis and phase shifter 9 imparts a suitable phase shift to this carrier such that the phase-shifted carrier is coincident with the blue color difference axis. These respective carriers are represented as $S_{c1}$ and $S_{c2}$, respectively.

Reference carriers $S_{c1}$ and $S_{c2}$ are adapted to be supplied to transducers 8 and 11, respectively, for the duration required to rotate record medium 1 one complete rotation. This is achieved by a timing signal generator 5 illustrated as being coupled to oscillator 6. The timing signal generator is adapted to energize oscillator 6 for the required duration upon closing a switch 4, such as a manual switch, coupled to the timing signal generator. As one example thereof, timing signal generator 5 may comprise a suitable pulse generator. Alternatively, the output of oscillator 6 may be coupled to a gate circuit (not shown) which is conditioned by timing signal generator 5.

As mentioned previously, if the illustrated apparatus is to record a color television signal, the color difference signals constituting the chrominance components are modulated by respective 3.58 MHz subcarriers. To this effect, modulators 13 and 15 are supplied with the red (R-Y) color difference signal and the blue (B-Y) color difference signal, respectively. Also, modulator 13 is supplied with reference carrier $S_{c1}$ which is played back from track $T_{c1}$ by transducer 8 and supplied to the modulator via an amplifier 12 when switch 7 exhibits the condition represented by engaging contact P. Similarly, modulator 15 is supplied with reference carrier $S_{c2}$ which is played back from track $T_{c2}$ by transducer 11 and supplied to the modulator via an amplifier 14 when switch 10 exhibits the condition represented by engaging contact P. The modulated (R-Y) and (B-Y) color difference signals produced by modulators 13 and 15 are supplied to a conventional encoder 16 together with a luminance component Y to produce a composite color television signal $S_v$, such as an NTSC signal. This composite signal is supplied to a transducer 17 for recording in a video track $T_v$ in signal information portion 2 of record medium 1.

Although readily apparent from the foregoing description, the operation of the recording apparatus illustrated in FIG. 1 nevertheless will be briefly described. Record medium 1 is rotated by suitable drive mechanism (not shown) and switches 7 and 10 exhibit the condition such that they both engage their respective contacts R for recording. Once record medium 1 attains a constant, stable speed, switch 4 is closed, such as manually or by a suitable control mechanism (not shown), to energize timing signal generator 5. The timing signal generator thus produces a timing signal whose duration is equal to that required for record medium 1 to complete one full rotation. This timing signal energizes oscillator 6 to produce reference carrier $S_{c1}$. This reference carrier is phase shifted by phase shifter 9 to produce reference carrier $S_{c2}$. These reference carriers are recorded by transducers 8 and 11 in circular tracks $T_{c1}$ and $T_{c2}$, respectively. After one complete rotation of record medium 1, the timing signal produced by timing signal generator 5 terminates to correspondingly terminate reference carriers $S_{c1}$ and $S_{c2}$. At this time, circular tracks $T_{c1}$ and $T_{c2}$ are provided with the respective reference carriers for their entire, respective lengths.

Now that the reference carriers have been recorded, switches 7 and 10 exhibit the condition whereby they engage their respective contacts P for playing back the recorded reference carriers. Thus, reference carrier $S_{c1}$, which is coincident with the (R-Y) axis is played back from track $T_{c1}$ by transducer 8, is amplified by amplifier 12 and is supplied to modulator 13. At the same time, reference carrier $S_{c2}$, which is coincident with the (B-Y) axis, is played back from track $T_{c2}$ by transducer 11, is amplified by amplifier 14 and is supplied to modulator 15.

The red color difference signal (R-Y) is modulated in modulator 13 onto reference carrier $S_{c1}$; and the blue color difference signal (B-Y) is modulated in modulator 15 onto reference carrier $S_{c2}$. As is typical, modulators 13 and 15 each may comprise a balanced modulator. The modulated signals produced by modulators 13 and 15 are supplied to encoder 16, together with luminance component Y, whereat these signals are combined to form the NTSC signal $S_v$ which is recorded by transducer 17 in track $T_v$. This track $T_v$ is a spiral track which is substantially concentric with circular tracks $T_{c1}$ and $T_{c2}$ within which reference carriers $S_{c1}$ and $S_{c2}$ are recorded.

It should be appreciated that the composite color television signal $S_v$ need not be provided with the usual burst signal. This is because the burst signal generally is used during signal reproduction to synchronize a local oscillator which generates a local reference carrier whose frequency and phase is synchronized with the subcarrier upon which the color difference signals (R-Y) and (B-Y) are modulated. However, since record medium 1 is provided with these subcarriers in tracks $T_{c1}$ and $T_{c2}$, these recorded reference carriers can be used directly during signal reproduction to obtain the required local carriers for demodulation.

In the embodiment just described, it has been assumed that the color television signal $S_y$ is recorded in a spiral track $T_y$ in signal information recording portion 2 of record medium 1. However, in an alternative embodiment, signal $S_y$ is recorded in a circular track. For example, a complete frame can be recorded in a single circular track such that as record medium 1 is rotated, this track can be continuously scanned during signal reproduction so as to reproduce the so-called still or stop-action picture. Thus, in successive circular tracks, additional frames can be recorded.

Also, although record medium 1 has been described as a magnetic disc, the record medium alternatively may comprise a video disc for recording video signals in the form of pits or grooves in a spiral track. To this effect, transducers 8, 11 and 17, which have been described as magnetic heads, can be replaced by optical heads, electron beam recording heads, and the like. For example, in signal recording, the surface of record medium 1 may be provided with a photoresist which is selectively exposed to information-modulated light. The exposed photoresist then can be developed and fixed to form a video disc having information modulated in the form of the aforementioned pits or grooves.

In yet another embodiment, the signal information recorded in portion 2 may comprise quadrature audio signals, such as right-front, left-front, right-back and left-back signals, each such signal being modulated onto an associated reference carrier. Consistent with this application, portion 3 may be provided with four circular tracks, each track adapted to record one of the aforementioned associated reference carriers.

As shown in FIG. 1, the signal information, such as the color difference signals (R-Y) and (B-Y) are modulated onto the reference carriers which are played back from tracks $T_{c1}$ and $T_{c2}$. In an alternative embodiment, reference carriers $S_{c1}$ and $S_{c2}$ which are derived from oscillator 6 are recorded in circular tracks on portion 3 of record medium 1 and, in addition, also are supplied to modulators 13 and 14 to be modulated by the signal information. That is, the carriers supplied to these modulators need not be the very same carriers which had been recorded on tracks $T_{c1}$ and $T_{c2}$. Instead, they may be supplied directly from oscillator 6.

Figure 2:
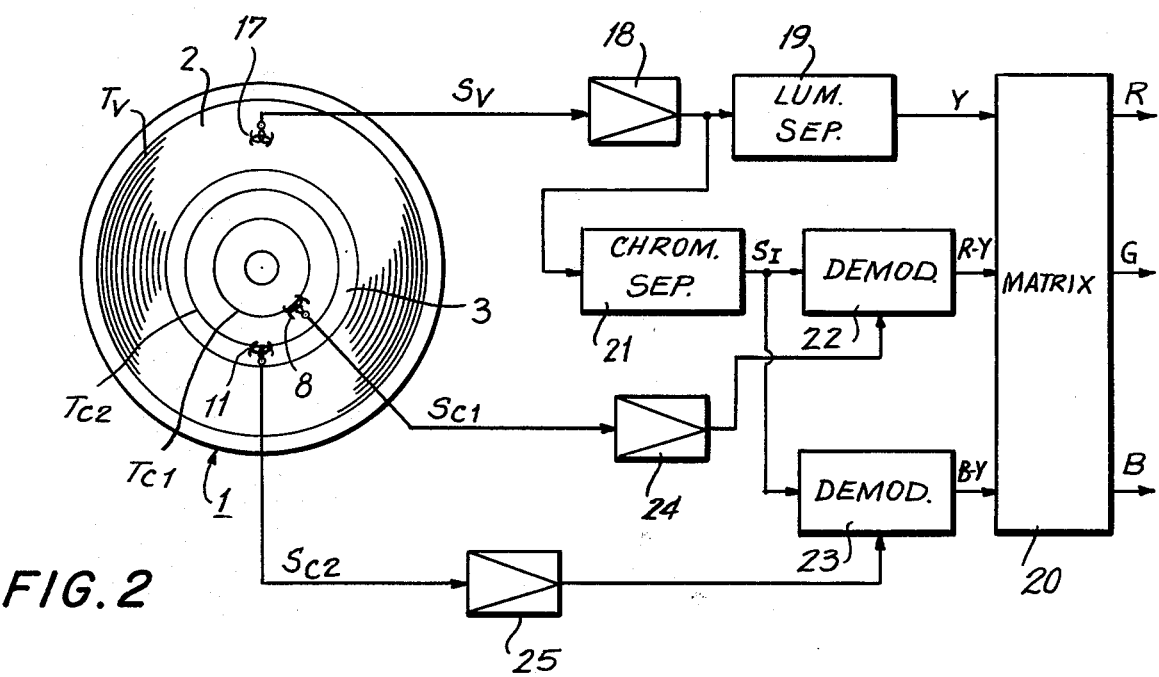
FIG. 2 is a block diagram of one embodiment of signal reproducing apparatus which can be used for recovering color television signal information.

Turning now to FIG. 2, there is illustrated signal reproducing apparatus for recovering the signal information recorded on record medium 1 by the apparatus illustrated in FIG. 1. Thus, in FIG. 2, record medium 1 is provided with a signal information recording portion 2 wherein modulated signal information is recorded in, for example, a spiral track $T_y$, and an auxiliary portion 3 in which reference carriers $S_{c1}$ and $S_{c2}$ are recorded in circular tracks $T_{c1}$ and $T_{c2}$, respectively. If it is assumed that record medium 1 is a magnetic disc, then the respective magnetic recording heads 8, 11 and 17, shown in FIG. 1, also can be used as playback heads, as is conventional. Of course, if desired, separate magnetic playback heads can be used.

Accordingly transducer 8 reproduces reference carrier $S_{c1}$, transducer 11 reproduces reference carrier $S_{c2}$ and transducer 17 reproduces the modulated signal information, such as the composite color television signal $S_y$. An amplifier 18 is coupled to transducer 17, and the luminance and chrominance components included in the composite color television signal $S_y$ are separated from the amplified signal by a luminance separator 19 and a chrominance separator 21, such as suitable filters, so as to derive the luminance component Y and the chrominance component $S_f$, respectively. In accordance with the example described previously, the chrominance component is formed of red and blue color difference signals (R-Y) and (B-Y) which are modulated on respective subcarriers of 3.58 MHz, these subcarriers being 90° apart in phase. In order to demodulate these respective color difference signals, the separated chrominance component $S_f$ is applied to demodulators 22 and 23, respectively. The carriers needed for demodulating the red color difference signal (R-Y) and the blue color difference signal (B-Y) are recovered from circular tracks $T_{c1}$ and $T_{c2}$ by transducers 8 and 11. These reproduced carriers $S_{c1}$ and $S_{c2}$ are supplied to demodulators 22 and 23, respectively, by amplifiers 24 and 25, as shown. Thus, the red color difference signal which had been modulated onto reference carrier $S_{c1}$ recorded in circular track $T_{c1}$ in FIG. 1 now is demodulated from this carrier by using the very same reference carrier $S_{c1}$ for demodulation. Similarly, the blue color difference signal which has been modulated onto the reference carrier $S_{c2}$ recorded in circular track $T_{c2}$ in FIG. 1 now is demodulated by using the very same reference carrier $S_{c2}$ for demodulation. The demodulated color difference signals (R-Y) and (B-Y) are combined with the separated luminance component Y in a conventional matrix circuit 20 to derive the primary color signals R, G and B, respectively, as is known. These primary color signals then can be used to control respective color electron beams to accurately reproduce a color television picture.

Thus, it may be appreciated that the local carrier which is used to demodulate the recorded modulated signal information is the very same carrier which can be used to modulate the signal information and which is recorded in information track $T_y$. Hence, even if record medium 1 is subjected to fluctuations during its rotation, the reference carriers $S_{c1}$ and $S_{c2}$ which are played back by transducers 8 and 11 will exhibit the very same changes and variations as the modulated carriers which are played back by transducer 17. Consequently, the variations in the reproduced modulated signal information $S_y$ that otherwise would appear as unwanted fluctuations, such as chromatic aberration in the reproduced color television picture, are cancelled. Therefore, the demodulated color difference signals (R-Y) and (B-Y) are independent of rotational fluctuations in record medium 1, even though such fluctuations result in variations in the frequency of reproduced signal information $S_y$.

In the embodiment of reproducing apparatus shown in FIG. 2, it is assumed that signal information recording portion 2 of record medium 1 is provided with a spiral information track $T_y$. However, if, as aforementioned, the modulated signal information $S_y$ is recorded in a complete circular track such that a full frame of color television signals is recorded in a respective circular track, then the apparatus illustrated in FIG. 2 can be used to reproduce a color television picture from such a circular information track. Thus, if record medium 1 is rotated at a rrate of 30 Hz (i.e., 30 rps), then a still picture will be reproduced when a single circular track is scanned. Of course, concentric circular information tracks can be recorded, each track corresponding to one frame of a still video picture.

It is recognized that record medium 1 need not be limited solely to a magnetic disc. The record medium alternatively may comprise an optically detectable disc wherein signal information and reference carriers are recorded in the form of pits or grooves on the surface of the disc. In that embodiment, transducers 8, 11 and 17 may be optical detectors, such as laser sources or other light sources capable of transmitting light beams to the signal information track and to the reference carrier tracks, and light detectors optically coupled to such tracks so as to sense the intensity of light which is reflected from the record medium and modulated by the pits or grooves which represent recorded signals.

In yet another embodiment, record medium 1 may comprise a rotatable drum from which the modulated signal information $S_y$ and reference carriers $S_c$ are reproduced.

In all of the foregoing embodiments, since the reference carriers recorded on auxiliary portion 3 of record medium 1 are used to demodulate the modulated signal information, it is appreciated that if such signal information is a composite color television signal, that color television signal need not include a burst signal. This is because the purpose of the burst signal, i.e., to synchronize a local oscillator for demodulating the chrominance components included in the composite color television signal, is obviated by recording the reference carries which themselves are used as the local oscillator signals.

Figure 3:
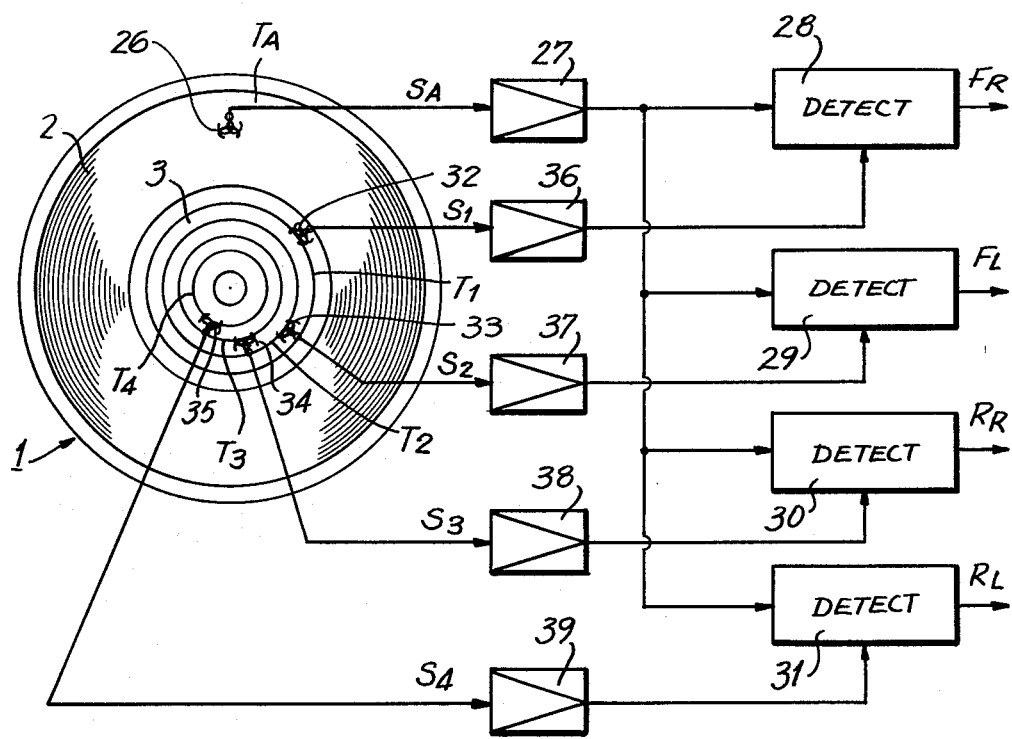
FIG. 3 is another block diagram of signal reproducing apparatus which can be used to recover quadrature audio signal information.

As mentioned previously, the signal information which is recorded on record medium 1 need not be limited solely to video signals in general or to color television signals in particular. For example, the modulated signal information can be a composite quadrature audio signal formed of right-front, left-front, right-back and left-back audio signals which represent audio sounds coming from corresponding source positions. One embodiment of apparatus which can be used to recover the individual audio signals from such a recorded composite quadrature audio signal is illustrated in FIG. 3. As shown, record medium 1 is comprised of a signal information recording portion 2 and an auxiliary portion 3 in which respective reference carriers are recorded. For the purpose of this description, it is assumed that record medium 1 is a magnetic disc. Of course, the various alternative embodiments of the record medium described above can be used, if desired. The composite quadrature audio signal $S_A$ is recorded in a spiral track $T_A$ wherein the respective right-front, left-front, right-back and left-back components are modulated onto individual carriers of frequencies $f_1, f_2, f_3$ and $f_4$, respectively. The audio signal components can be amplitude modulated onto the respective carriers; but any other type of modulation can be used, if desired. Similarly, although it has been assumed that carriers of different frequencies are modulated with the audio components, the respective carriers can exhibit different phases or various combinations and permutations of frequency and phase, if desired.

A transducer 26 is provided to scan spiral track $T_A$, and respective transducers 32, 33, 34 and 35 are provided to scan concentric circular tracks $T_1, T_2, T_3$ and $T_4$, respectively, wherein reference carriers $f_1, f_2, f_3$ and $f_4$ are recorded. The composite quadrature audio signal $S_A$ reproduced by transducer 26 is supplied through an amplifier 27 to respective detectors 28, 29, 30 and 31. Reference carrier $S_1$ reproduced by transducer 32 is supplied through an amplifier 36 to detector 28. In similar fashion, reference carriers $S_2$, $S_3$ and $S_4$ reproduced by transducers 33, 34 and 35, respectively, are supplied through amplifiers 37, 38 and 39 to detectors 29, 30 and 31, respectively.

Thus, it is seen that reference carrier $S_1$ of frequency $f_1$ reproduced from track $T_1$ is used to demodulate the right-front audio signal $F_R$ from the composite quadrature audio signal $S_A$ in detector 28. Reference carrier $S_2$ of frequency $f_2$ recorded in track $T_2$ is used to demodulate the left-front audio component $F_L$ from the composite quadrature audio signal $S_A$ in detector 29. Reference carrier $S_3$ of frequency $f_3$ recorded in track $T_3$ in used to demodulate the right-back component $R_R$ from the composite quadrature audio signal $S_A$ in detector 30. Finally, in accordance with the illustrated embodiment, reference carrier $S_4$ of frequency $f_{4\ l\ recorded\ in\ track\ T4}$ is used to demodulate the left-back component $R_L$ from the composite quadrature audio signal $S_A$ in detector 31. The resultant demodulated audio signal components can be used to drive suitable sound generators, such as loudspeakers, or the like, so as to reproduce audio signals having the effect of discrete right-front, left-front, right-back and left-back sound sources.

Thus, even if record medium 1, shown in FIG. 3, is subjected to rotational fluctuations, the resultant changes in the frequency of the composite quadrature audio signal $S_A$ will be equal to the changes in frequencies of the recorded reference carriers $S_1, \ldots S_4$. Consequently, these frequency variations will cancel each other in detectors 28, ... 31 such that the demodulated audio signal components will be subtantially free of undesired variations due to such rotational fluctuations in record medium 1.

Although record medium 1 has been assumed to be a magnetic disc in FIG. 3, it is recognized that various alternative embodiments thereof are contemplated, such as the various media described above.

While the present invention has been particularly shown and described with reference to certain preferred embodiments thereof, it should be readily appreciated that various changes and modifications in form and details can be made by one of ordinary skill in the art without departing from the spirit and scope of the invention. For example, the signal information recorded in information recording portion 2 of record medium 1 can represent data other than video or audio signal information. It is contemplated that such modulated signal information may be a digital signal, such as a pulse code signal. In that event, auxiliary portion 3 can be provided with a single track in which a reference clock pulse signal is recorded. As another example, if the disclosed apparatus is used to record and reproduce video signal information, the color television signal $S_v$ need not be limited solely to an NTSC signal. A PAL signal can be recorded in information recording portion 2. In this regard, a controlled phase inverter may be supplied with reference carrier $S_{c1}$ so as to apply a phase-inverted reference carrier to demodulator 22 during alternate line intervals. As yet another example, auxiliary portion 3 in each of the illustrated embodiments can be supplied with a single circular track in which a single reference carrier is recorded. The frequency and/or phase of this reference carrier then can be processed as desired during signal reproduction. For example, in the FIG. 1 embodiment, this reference carrier can be reproduced and supplied directly to modulator 13 and supplied through a 90° phase shifter to modulator 15. Similarly, in the FIG. 2 embodiment, this reference carrier can be reproduced and supplied directly to demodulator 22 and supplied through a 90° phase shifter to demodulator 23. In the FIG. 3 embodiment, this reference carrier can be reproduced and supplied directly to detector 31 and through various frequency dividers (or multipliers) to the remaining detectors. As mentioned above, in all of these various alternative embodiments, record medium 1 may comprise a magnetic disc, an optically detectable disc, or the like. Therefore, it is intended that the appended claims be interpreted as including all of these alternative embodiments, modifications and changes.

What is claimed is:

1. A method of recovering information from a record medium wherein said information is a color television signal and is modulated and recorded in an information track on one portion of said record medium and a reference carrier is recorded on another portion of said record medium, said reference carrier comprising first and second reference carriers recorded on first and second reference tracks, respectively, said method comprising the steps of rotating said record medium; reproducing said modulated information from said one portion of said record medium; simultaneously reproducing said reference carrier from said other portion of said record medium; and demodulating said reproduced modulated information with said reproduced reference carrier by separating the reproduced color television signal into luminance and chrominance components, and demodulating said chrominance components with the reproduced first and second reference carriers.

2. The method of claim 1 wherein said step of demodulating further comprises the additional step of matrixing said separated luminance component and the signals produced by demodulating said chrominance components with said first and second reference carriers to produce respective color signals.

3. A method of recovering information from a record medium wherein said information is a composite quadrature audio signal having right-front, left-front, right-back, and left-back components modulated onto respective carriers and recorded in an information track on one portion of said record medium and a reference carrier is recorded on another portion of said record medium, said reference carrier comprising first, second, third and fourth reference carriers recorded on first, second, third and fourth reference tracks, respectively; said method comprising the steps of rotating said record medium; reproducing said modulated information from said one portion of said record medium; simultaneously reproducing said reference carrier from said other portion of said record medium; and demodulating said reproduced modulated information with said reproduced reference carrier by demodulating said composite signal with the reproduced first, second, third and fourth reference carriers to detect said right-front, left-front, right-back and left-back component signals, respectively.

4. A method of recording information modulated onto a reference carrier on a record medium, wherein said record medium is a magnetic disc, said information comprises chrominance components and a luminance component of color television signals, and said reference carrier comprises first and second reference carriers, said method comprising the steps of rotating said record medium; providing said first and second reference carriers; recording said reference carriers on a portion of said record medium; providing information signals; modulating said information signals with said reference carriers by modulating two of said chrominance components with said first and second reference carriers, respectively; and recording said modulated information signals on another portion of said record medium by combining said modulated chrominance components and said luminance component to form a composite color television signal, and recording said composite color television signal.

5. The method of claim 4 wherein said first and second reference carriers are recorded in respective concentric circular tracks.

6. Signal reproducing apparatus comprising: a rotatable record medium having an information portion wherein signal information modulated on a reference carrier is recorded and a separate portion wherein said reference carrier is recorded without modulation the modulated signal information comprising a composite color television signal and said reference carrier comprising first and second carrier signals recorded in separate, concentric circular tracks on said record medium; a first transducer for reproducing said recorded, modulated signal information; second transducer means for reproducing said recorded first and second carrier signals; and demodulating means supplied with said reproduced modulated composite color television signal and the reproduced first and second carrier signals for demodulating said composite color television signal with said carrier signals.

7. The apparatus of claim 6 wherein said composite color television signal is recorded in a spiral track.

8. The apparatus of claim 6 wherein said composite color television signal is recorded in at least one circular track.

9. Signal reproducing apparatus comprising: a rotatable record medium having an information portion wherein signal information modulated on a reference carrier is recorded and a separation portion wherein said reference carrier is recorded, the modulated signal information comprising a composite color television signal and said reference carrier comprising first and second carrier signals recorded in separate, concentric circular tracks on said record medium; a first transducer for reproducing said recorded, modulated color television signal; second transducer means for reproducing said recorded carrier signals; and demodulating means supplied with said reproduced color television signal and said reproduced carrier signals for demodulating said signal information with said carrier signals, said demodulating means comprising separator means for separating the reproduced composite color television signal into a luminance component and modulated chrominance components; first demodulator means coupled to said separator means and responsive to the reproduced first carrier signal for demodulating a first color component from said chrominance components; second demodulator means coupled to said separator means and responsive to the reproduced second carrier signal for demodulating a second color component from said chrominance components; and means supplied with said luminance component, said first color component and said second color component for producing respective primary color signals.

10. The apparatus of claim 9 wherein said first and second color components are respective color difference signals.

11. Signal reproducing apparatus comprising: a rotatable record medium having an information portion wherein signal information modulated on a reference carrier is recorded and a separate portion wherein said reference carrier is recorded, the modulated signal information comprising a composite quadrature audio signal and said reference carrier comprising first, second, third and fourth carrier signals recorded in separate, concentric circular tracks on said record medium; a first transducer for reproducing said recorded, modulated signal information; respective transducers for reproducing said recorded reference carrier; and demodulating means supplied with said reproduced modulated quadrature audio signal and said reproduced carrier signals for demodulating said quadrature audio signal with said carrier signals.

12. The apparatus of claim 11 wherein said demodulating means comprises first, second, third and fourth detectors, each supplied with said composite quadrature audio signal and with a respective reproduced carrier signal for producing right-front, left-front, right-back and left-back audio signals, respectively.

13. Signal recording apparatus comprising a rotatable record medium; an oscillator for producing a reference signal; first transducer means for recording said reference signal in a circular track on said reference medium; and means for supplying said reference signal to said first transducer means for one rotation of said record medium; an information source for providing signal information; modulating means for modulating said reference signal with said signal information; second transducer means for recording modulated signal information on a separate portion of said record medium; and means for supplying said second transducer means with said modulated signal information.

14. Signal recording apparatus comprising a rotatable record medium; a reference signal source for providing a reference signal; an information source for providing signal information; modulating means for modulating said reference signal with said signal information; a first transducer for recording said reference signal in a circular track on said record medium, said first transducer comprising a record/playback head and further comprising switch means having a first condition for supplying said reference carrier to said first transducer for recording said reference carrier in said circular track and a second condition for supplying said reference carrier played back by said first transducer to said modulating means whereat said played back reference carrier is modulated with said signal information; a second transducer for recording modulated signal information on a separate portion of said record medium; and means for supplying said second transducer with said modulated signal information.

15. Signal recording apparatus comprising a rotatable record medium; an information source for providing signal information, said signal information comprising color video signal components and a luminance component; a reference signal source for providing a reference signal, said reference signal comprising first and second reference carriers; first transducer means for recording said reference signal on said record medium, said first transducer means comprising a pair of transducers for recording said first and second reference carriers in respective circular tracks; modulating means for modulating said reference signal with said signal information, said modulating means comprising a first modulator supplied with one color video signal component and said first reference carrier and a second modulator supplied with another color video signal component and said reference carrier; second transducer means for recording modulated signal information on a separate portion of said record medium; and means for supplying said second transducer means with said modulated signal information said means for supplying said second transducer means comprising combining means supplied with said luminance component and the modulated reference carriers produced by said first and second modulators to supply a composite color television signal to said second transducer means.

16. The apparatus of claim 15 wherein said first and second reference carriers have equal frequencies and are phase shifted with respect to each other; and said color video signal components are color difference signals.

* * * * *